(12) United States Patent
Graham et al.

(10) Patent No.: US 11,724,477 B2
(45) Date of Patent: Aug. 15, 2023

(54) FLEXIBLE TUBULAR STRUCTURE

(71) Applicant: LONG PIPES USA, INC., Yangebup (AU)

(72) Inventors: Arthur Derrick Bray Graham, North Fremantle (AU); Neil Deryck Bray Graham, Coogee (AU)

(73) Assignee: LONG PIPES USA, INC., Yangebup (AU)

( * ) Notice: Subject to any disclaimer, the term of this patent is extended or adjusted under 35 U.S.C. 154(b) by 37 days.

(21) Appl. No.: 16/609,113

(22) PCT Filed: Apr. 28, 2017

(86) PCT No.: PCT/AU2017/050394
§ 371 (c)(1),
(2) Date: Oct. 28, 2019

(87) PCT Pub. No.: WO2017/185143
PCT Pub. Date: Nov. 2, 2017

(65) Prior Publication Data
US 2020/0198282 A1 Jun. 25, 2020

(30) Foreign Application Priority Data
Apr. 28, 2016 (AU) .................. 2016901564

(51) Int. Cl.
*B32B 1/08* (2006.01)
*B29C 48/09* (2019.01)
(Continued)

(52) U.S. Cl.
CPC .............. *B32B 1/08* (2013.01); *B29C 48/09* (2019.02); *B29C 48/21* (2019.02); *B32B 7/12* (2013.01);
(Continued)

(58) Field of Classification Search
CPC .. B32B 1/08; B32B 7/12; B32B 27/08; B32B 27/30; B32B 27/32; B32B 27/40;
(Continued)

(56) References Cited

U.S. PATENT DOCUMENTS

| 5,271,977 A | 12/1993 | Yoshikawa et al. |
| 5,362,530 A * | 11/1994 | Kitami .................. B32B 27/08 |
| | | 428/36.2 |

(Continued)

FOREIGN PATENT DOCUMENTS

| EP | 1560496 A2 | 8/2005 |
| EP | 2 835 395 A1 | 2/2015 |

(Continued)

OTHER PUBLICATIONS

Hawley's Condensed Chemical Dictionary, Thirteenth Edition, Richard J. Lewis, Sr., p. 964. (Year: 1997).*

(Continued)

*Primary Examiner* — Michael C Miggins
(74) *Attorney, Agent, or Firm* — Merchant & Gould P.C.

(57) ABSTRACT

A tube (10) and a method of constructing such a tube, the tube (10) being in the form of a composite film structure comprising a co-extrusion of a plurality of layers bonded together to provide an integrated structure. The layers comprise an inner layer (11), an intermediate layer (12) and outer layer (13). The intermediate layer (12) is of a material compatible with two adjacent layers (11, 13) between which it is interposed, wherein the intermediate layer (12) provides a bridge between the two layers (11, 13) to provide the tube (10) as an integrated structure. The exterior surface (15) of the tube (10) is optionally treated or modified or is provided with a coating, typically for bonding with another substance such as a resinous binder. A hollow structure in the form of a tubular element configured as a pipe and constructed using the tube (10) is also disclosed.

17 Claims, 8 Drawing Sheets

(51) Int. Cl.
*B29C 48/21* (2019.01)
*B32B 7/12* (2006.01)
*B32B 27/08* (2006.01)
*B32B 27/30* (2006.01)
*B32B 27/32* (2006.01)
*B32B 27/40* (2006.01)

(52) U.S. Cl.
CPC .............. *B32B 27/08* (2013.01); *B32B 27/30* (2013.01); *B32B 27/32* (2013.01); *B32B 27/40* (2013.01); *B32B 2250/03* (2013.01); *B32B 2597/00* (2013.01)

(58) Field of Classification Search
CPC . B32B 2250/03; B32B 2597/00; B29C 48/09; B29C 48/21
See application file for complete search history.

(56) References Cited

U.S. PATENT DOCUMENTS

| | | | | |
|---|---|---|---|---|
| 5,380,571 A | * | 1/1995 | Ozawa | ...................... B32B 1/08 428/36.9 |
| 5,799,704 A | | 9/1998 | Andre | |
| 5,972,447 A | | 10/1999 | Hata et al. | |
| 6,009,912 A | * | 1/2000 | Andre | ................... B21C 37/122 138/143 |
| 6,436,495 B1 | | 8/2002 | Tsukamoto et al. | |
| 6,581,643 B2 | | 6/2003 | Guippe et al. | |
| 2001/0031330 A1 | | 10/2001 | Ito et al. | |
| 2007/0194481 A1 | * | 8/2007 | Iio | ........................... B29C 48/09 264/171.27 |
| 2008/0248226 A1 | | 10/2008 | Simon et al. | |
| 2014/0261843 A1 | | 9/2014 | Graham | |

FOREIGN PATENT DOCUMENTS

| | | |
|---|---|---|
| JP | 2005-089483 A | 4/2005 |
| JP | 2014-532570 A | 12/2014 |
| WO | 2012/054992 A1 | 5/2012 |
| WO | 2015/184488 A1 | 12/2015 |
| WO | 2016/025663 A1 | 2/2016 |

OTHER PUBLICATIONS

International Search Report for International Application No. PCT/AU2017/050394 dated Jul. 13, 2017 (8 pages).
International Written Opinion for International Application No. PCT/AU2017/050394 dated Jul. 13, 2017 (8 pages).
European Search Report for EP Application No. 17788437 dated Oct. 14, 2020 (5 pages).

* cited by examiner

FLEXIBLE TUBULAR STRUCTURE

This application is a National Stage Application of PCT/AU2017/050394, filed 28 Apr. 2017, which claims benefit of Ser. No. 2016901564, filed 28 Apr. 2016 in Australia and which applications are incorporated herein by reference. To the extent appropriate, a claim of priority is made to each of the above disclosed applications.

TECHNICAL FIELD

This invention relates to a flexible tubular structure which will hereinafter be referred to as a tube.

More particularly, the invention concerns a flexible tube for use in the construction of a hollow structure comprising an inner portion defined by the tube and an outer portion of reinforced-fibre construction integral with the inner portion. The invention also relates to a hollow structure constructed using such a tube. Further, the inventions relates to methods of constructing a tube and also a hollow structure.

The tube according to the invention has been devised particularly, although not solely, for use in the construction of elongate hollow structures of composite construction, including tubular structures in the form of pipes, tubular elements such as ducts and tubes, tubular structural elements such as hollow shafts, beams and columns, hollow bodies such as tanks, hull structures including such structures for aircraft, and other hollow elements of composite construction.

BACKGROUND ART

The following discussion of the background art is intended to facilitate an understanding of the present invention only. The discussion is not an acknowledgement or admission that any of the material referred to is or was part of the common general knowledge as at the priority date of the application.

The tube according to the invention is particularly applicable to construction of an elongate hollow structure such as a pipe as described and illustrated in the Applicant's international application PCT/AU2011/001401, the contents of which are incorporated herein by way of reference. Accordingly, the invention will primarily be discussed in relation to a tube for use in construction of such an elongate hollow structure. However, it should be understood that the invention may have application to the construction of various other hollow bodies, including, for example, pipes, ducts, tubes and other tubular elements, tubular structural elements such as shafts, beams and columns, hollow bodies such as tanks, hull structures including such structures for aircraft, and other hollow elements of composite construction.

International application PCT/AU2011/001401 is directed to an elongate hollow structure in the form of a tubular element configured as a pipe and to a method of construction of the pipe on a continuous basis.

The pipe is of composite construction, comprising a radially inner portion and a radially outer portion, with the two portions merging together to provide an integrated tubular wall structure. The inner portion is configured as an inner tube constructed from an inner liner, with a layer of resin absorbent material bonded onto one face thereof. The other face of the inner liner defines the interior surface of the pipe. Typically, the inner liner presents a high gloss surface at the inner face. The inner liner may, for example, comprise polyurethane, polyethylene or any other resiliently flexible material which is preferably also impervious to air and also compatible to fluid to be conveyed within the pipe. The resin absorbent layer may, for example, comprise felt or flock.

The inner tube is constructed from a strip of material which provides the inner liner by rolling the strip longitudinally into a tubular configuration.

The outer portion is configured as an outer tube of fibre reinforced composite construction surrounded by a flexible outer casing. More particularly, the outer tube comprises reinforcement impregnated in a resinous binder. The flexible outer casing is installed around the outer tube to contain the resinous binder, and may remain in place and ultimately form an integral part of the pipe or it may be subsequently removed after having served its purpose.

The resinous material which provides the resinous binder may be of any appropriate type; a particularly suitable resinous material may comprise thermosetting resin such as epoxy vinyl ester or other suitable resin and thermoplastic resin systems.

The reinforcement may comprise one or more layers of reinforcing fabric, each layer being configured as an annular element disposed about the inner tube. The reinforcing fabric may comprise reinforcing fabric which incorporates reinforcement fibres featuring quadraxial fibre orientations. The reinforcement fibres may comprise glass fibres. The quadraxial fibre orientations offer the necessary hoop and axial stress bearing properties to the pipe.

Constructing the inner tube from a strip of material which is rolled longitudinally into a tubular configuration is not particularly conducive to cost-effective manufacture on a large scale. Further, with such a construction, the inner tube is likely to be vulnerable to leakage at the longitudinal joint, and also vulnerable to pin holes from the single layer construction.

It is against this background that the present invention has been developed.

SUMMARY OF INVENTION

According to a first aspect of the invention there is provided a tube formed as a co-extrusion composite film structure comprising a plurality of layers, the plurality of layers comprising an inner layer defining an interior surface of the tube, an outer layer defining an exterior surface of the tube for bonding with a binder, and at least one intermediate layer between the inner and outer layers, the intermediate layer being of a material compatible with two adjacent layers between which it is interposed.

The tube may be formed as a co-extrusion composite film structure in a multi-layer blown film extrusion process (also known as a tubular film extrusion process).

The tube may comprise three layers, whereby there is a single intermediate layer between the inner and outer layers. However, there may be more than one intermediate layer. In one embodiment there are three layers, although it is likely that there would be at least five layers and perhaps nine to 11 layers. Layers in excess of 11 layers are also contemplated.

There may be adhesive between the layers or between at least some of the layers.

With the multi-layer construction of the tube, it is considered to be less likely to be vulnerable to leakage through pin holes in the layers. In the event that there is a pin hole in one layer, it is unlikely that the pin hole will be in registration with pin holes in adjacent layers to provide a leakage path through the tube wall.

The inner layer preferably comprises a material compatible with the intended application of the tube. By way of example, where the intended application of the tube is a radially inner portion of a pipe of composite construction for transport of a fluid (gas, liquid or other flowable material such as a slurry), the inner layer would preferably be of a material compatable with the fluid. This may require that the inner layer provide a tube wall which has (but which is not limited to) one or more of the following characteristics: impervious to the fluid, impermeable to gas or gasses, chemically resistant to the fluid, relatively low resistance to fluid flow, resistant to corrosion, resistant to abrasion and wear, and resistant to rupturing or tearing.

In one embodiment, the inner layer may comprise a thermoplastic polyurethane (TPU) or material of the polyether variety so as to provide excellent hydrolysis resistance. Other suitable materials may also be used for the inner layer, such as for example ethylene-vinyl alcohol (EVOH) or polyethylene (PE, LLDPE or HDPE), as would be understood by a person skilled in the art.

The outer layer preferably comprises a material compatible with a binder. By way of example, the binder in be in the form of a thermosetting resin.

In one embodiment, the outer layer may comprise a plastic such as polyvinyl chloride/vinyl (PVC) or some acrylic co-polymer, vinyl or co-polymer vinyl.

An outer layer comprising a thermoplastic rubber (for example, thermoplastics elastomer (TPE) is advantageous as it is flexible and relatively easily scuffed, and is particularly suitable in applications where the resin comprises a vinyl ester resin as the resin can chemically "bite" into the rubber side of the thermoplastic. This is also suitable for a polyester based TPU where the polyester is compatible with the PVC and vinyl ester resin matrix.

Other suitable materials may also be used for the outer layer, as would be understood by a person skilled in the art.

The intermediate layer may comprise a copolymer compatible for bonding with the two adjacent layers. This may involve use of an intervening material such as an adhesive which is compatible with both the intermediate layer and the respective adjacent layer to thereby establish a bond therebetween.

Where the inner layer comprises TPU and the outer layer comprises a vinyl or co-polymer vinyl, the two layers may not be sufficiently compatible to an extent to provide an integrated structure that can be extruded, and so an intervening medium constituted by the intermediate layer(s) may be required to provide a bridge between the two layers. In this way, the intermediate layer cooperates with the inner and outer layers to provide an integrated structure which constitutes the tube.

The intermediate layer may, for example, comprise a blend of thermoplastic polyurethanes (TPUs), such as a blend of ester and ether. Other suitable materials may also be used for the intermediate layer, as would be understood by a person skilled in the art. The number and characteristics of each adhesive to bond adjacent layers together would be selected according to the intended application, as would be understood by a person skilled in the art.

The exterior surface of the tube may be treated or modified to facilitate bonding with a substance such as a binder.

The treatment may comprise surface modification. By way of example, the treatment may comprise corona treatment featuring low temperature corona discharge plasma to effect changes in the properties of the exterior surface of the tube.

The exterior surface of the tube may bond with the binder mechanically as well as chemically.

The exterior surface of the tube may be treated to facilitate a mechanical bond with the binder. The exterior surface may be so treated by provision of a formation on the exterior surface conducive to mechanically bonding with the binder. By way of example, the formation may comprise texturing, knurling, scuffing, tearing, abrading, grinding or other roughening on the surface. The formation may present protrusions projecting from the tube, the protrusions being configured for anchoring in the binder. Further, the formation may comprise an anchoring structure applied to the surface; for example, spicules of fibre sprayed onto and embedded in the exterior surface using heat.

The exterior surface of the tube may have a coating applied thereto to facilitate bonding with the binder. The coating may comprise a continuous coating along the exterior surface of the tube, or the coating may be provided intermittently (i.e. at intervals along the tube). Where the coating is provided intermittently, it may for example comprise patches or tufts of coating material on the exterior surface of the tube. The coating may be applied in any appropriate way, such as by heat welding.

The coating may be of any appropriate material; for example, the coating may comprise binder absorbent material. In one embodiment the coating may comprise polyester cloth.

The coating may comprise a wetting material. The wetting material may be bonded such as by heat welding to the tube to provide a chemical and mechanical bond between the tube and the binder. The wetting material may comprise a polyester felt.

The coating may serve to facilitate a resin-rich layer in direct contact with the outer surface of the tube.

According to a second aspect of the invention there is provided a method of forming a tube according to the first aspect of the invention, the method comprising co-extruding the plurality of layers.

The method may comprise provision of adhesive between adjacent layers. The adhesive may be applied as a coextruded layer or applied in some other way, such as for example by spraying onto the surface of one or more of the layers.

According to a third aspect of the invention there is provided a method of forming a tube as a composite film structure comprising a plurality of layers, the method comprising co-extruding an inner layer defining an interior surface of the tube, an outer layer defining an exterior surface of the tube for bonding with a binder, and at least one intermediate layer between the inner and outer layers, the intermediate layer being of a material compatible with two adjacent layers between which it is interposed.

There may be more than one intermediate layer. I

The method may further comprise treating the outer surface of the outer layer to facilitate a mechanical bond with the binder. The exterior surface may be so treated by provision of a formation on the exterior surface conducive to mechanically bonding with the binder.

According to a fourth aspect of the invention there is provided a tube constructed using the method according to the third aspect of the invention.

According to a fifth aspect of the invention there is provided a hollow structure comprising a tube according to the first or fourth aspect of the invention.

According to a sixth aspect of the invention there is provided a hollow structure of composite construction, the hollow structure comprising a radially inner portion and a radially outer portion, with the two portions merging together to provide an integrated tubular wall structure, the inner portion being configured as a tube formed as a co-extrusion composite film structure comprising a plurality of layers, the plurality of layers comprising an inner layer defining an interior surface of the tube, an outer layer defining an exterior surface of the tube for bonding with a binder, and at least one intermediate layer between the inner and outer layers.

The intermediate layer may be of a material compatible with two adjacent layers between which it is interposed.

There may be more than one intermediate layer.

The exterior surface of the tube may be treated or modified to facilitate bonding with the binder.

The treatment may comprise surface modification. By way of example, the treatment may comprise corona treatment featuring low temperature corona discharge plasma to effect changes in the properties of the exterior surface of the tube.

The exterior surface of the tube may bond with the binder mechanically as well as chemically.

The exterior surface of the tube may be treated to facilitate a mechanical bond with the binder. The exterior surface may be so treated by provision of a formation on the exterior surface conducive to mechanically bonding with the binder. By way of example, the formation may comprise texturing, knurling, scuffing, tearing, abrading, grinding or other roughening on the surface. The formation may present protrusions projecting from the tube, the protrusions being configured for anchoring in the binder. Further, the formation may comprise an anchoring structure applied to the surface; for example, spicules of fibre sprayed onto and embedded in the exterior surface using heat.

The exterior surface of the tube may have a coating applied thereto to facilitate bonding with the binder. The coating may comprise a continuous coating along the exterior surface of the tube, or the coating may be provided intermittently (i.e. at intervals along the tube). Where the coating is provided intermittently, it may for example comprise patches or tufts of coating material on the exterior surface of the tube. The coating may be applied in any appropriate way, such as by heat welding.

The coating may be of any appropriate material; for example, the coating may comprise binder absorbent material. In one embodiment the coating may comprise polyester cloth.

The coating may comprise a wetting material. The wetting material may be bonded such as by heat welding to the tube to provide a chemical and mechanical bond between the tube and the binder. The wetting material may comprise a polyester felt.

The coating may serve to facilitate a resin-rich layer in direct contact with the outer surface of the tube.

Preferably, the outer portion comprises an outer tube of fibre reinforced composite construction formed about the tube which provides the inner portion.

More particularly, the outer tube comprises reinforcement impregnated in a resin which provides the binder.

The hollow structure may further comprise a flexible outer casing surrounding the outer tube. With this arrangement, the flexible outer casing is installed around the outer tube to contain the resinous binder. The flexible outer casing may remain in place and ultimately form an integral part of the hollow structure or it may be subsequently removed after having served its purpose.

The resinous material which provides the resinous binder may be of any appropriate type; a particularly suitable resinous material may comprise thermosetting resin such as epoxy vinyl ester or other suitable resin and thermoplastic resin systems.

The reinforcement may comprise one or more layers of reinforcing fabric, each layer being configured as a tubular structure disposed about the inner tube.

The hollow structure according to the sixth aspect of the invention may comprise an elongate hollow structure.

According to a seventh aspect of the invention there is provided a method of constructing a hollow structure comprising a radially inner portion and a radially outer portion, with the two portions merging together to provide an integrated tubular wall structure, the method comprising: forming the inner portion as a tube comprising a co-extrusion of an inner layer defining an interior surface of the tube, an outer layer defining an exterior surface of the tube for bonding with a binder, and at least one intermediate layer between the inner and outer layers, and assembling the radially outer portion about the tube, the outer portion being of fibre reinforced composite construction including reinforcement and said binder.

The intermediate layer is selected to be of a material compatible with two adjacent layers between which it is interposed.

There may be more than one intermediate layer.

The method may further comprise treating or modifying the exterior surface of the tube to facilitate bonding with the binder.

The method may further comprise applying a coating to the exterior surface of the tube to facilitate bonding with the binder.

The method may further comprise expanding the tube to cause radial expansion thereof while resisting expansion of the outer side of the radially outer portion thereby causing the binder to spread.

The method may further comprise positioning a flexible outer casing about the radially outer portion, wherein the radially expanding tube operates in conjunction with the flexible outer casing to cause the volume of a space between the tube and the flexible outer casing to progressively decrease thereby causing the binder to spread within the space.

According to a ninth aspect of the invention there is provided a hollow structure constructed using the method according to the eight aspect of the invention.

According to a tenth aspect of the invention there is provided a tube assembly comprising a tube formed as a co-extrusion composite film structure comprising a plurality of layers, the plurality of layers comprising an inner layer defining an interior surface of the tube assembly, and an outer layer defining an exterior surface of the tube, wherein the exterior surface of the tube is treated or modified to facilitate bonding with the binder.

According to an eleventh aspect of the invention there is provided a tube assembly comprising a tube formed as a co-extrusion composite film structure comprising a plurality of layers, the plurality of layers comprising an inner layer defining an interior surface of the tube assembly, an outer layer defining an exterior surface of the tube, and a coating applied to the exterior surface of the tube.

The coating may be applied to facilitate bonding with a binder.

The coating may comprise a continuous coating along the exterior surface of the tube, or the coating may be provided intermittently (i.e. at intervals along the tube). Where the coating is provided intermittently, it may for example comprise patches or tufts of coating material on the exterior surface of the tube. The coating may be applied in any appropriate way, such as by heat welding.

The coating may be of any appropriate material; for example, the coating may comprise binder absorbent material. In one embodiment the coating may comprise polyester cloth.

The coating may comprise a wetting material. The wetting material may be bonded such as by heat welding to the tube to provide a chemical and mechanical bond between the tube and the binder. The wetting material may comprise polyester felt.

The coating may serve to facilitate a resin-rich layer in direct contact with the outer surface of the tube.

The coating may comprise one or more strips of coating material applied to the exterior surface of the tube. Preferably, the coating comprises a plurality of strips, and more preferably two strips. In the case of a plurality of strips of coating material, the strips may be applied in generally side-by-side relation. Adjacent longitudinal marginal edge portions of the strips may, for example, be in overlapping relation or in abutting relation. Other arrangements are contemplated; for example, adjacent longitudinal marginal edge portions of the strips may be interconnected in some other way (such as, for example, by way of a tape applied between the marginal edge portions), or alternatively adjacent longitudinal marginal edge portions of the strips may be in spaced apart relation to define a gap therebetween.

According to a twelfth aspect of the invention there is provided a method of forming a tube assembly having a multi-layered tube and a coating on an exterior surface of the tube, the method comprising co-extruding an inner layer defining an interior surface of the tube and an outer layer defining an exterior surface of the tube, and applying the coating to the exterior surface of the tube.

The coating may be applied by applying longitudinal strips of coating material to the exterior surface of the tube.

The longitudinal strips may comprise two strips applied about the tube. The longitudinal marginal edge portions of the two strips may be in overlapping or abutting relation one with respect to the other.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

The figures depict embodiments of the invention. The embodiments illustrates certain configurations; however, it is to be appreciated that the invention can take the form of many configurations, as would be obvious to a person skilled in the art, whilst still embodying the present invention. These configurations are to be considered within the scope of this invention.

DESCRIPTION OF EMBODIMENTS

Figure 1:
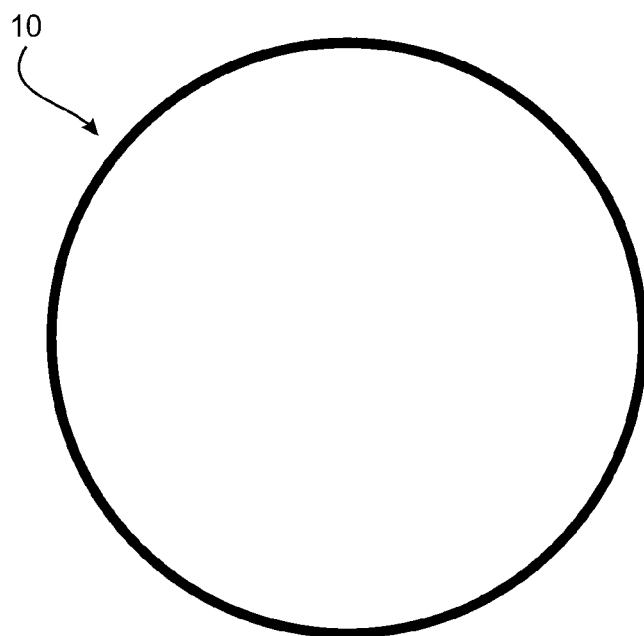
FIG. 1 is a schematic cross-sectional view of a tube according to a first embodiment of the invention, the tube comprising a co-extrusion of a plurality of layers bonded together to provide an integrated structure.
Figure 2:
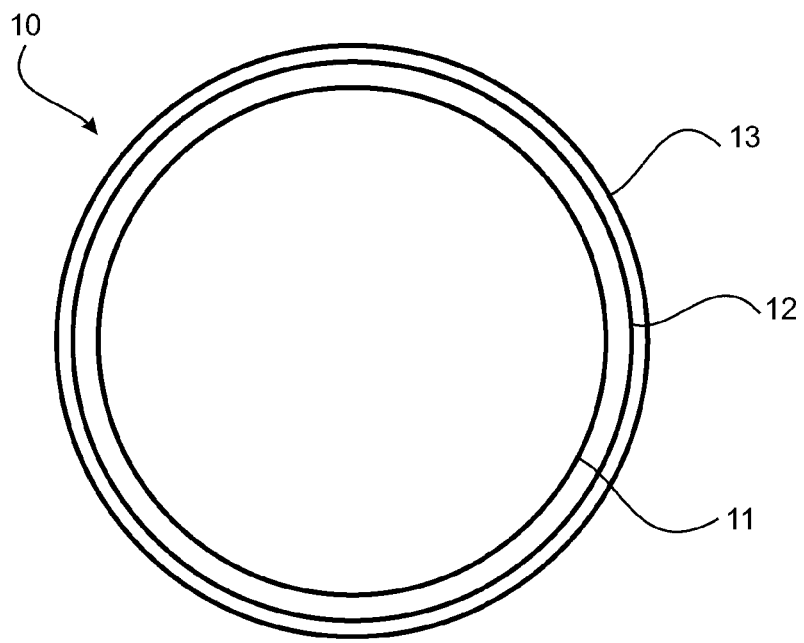
FIG. 2 is a view similar to FIG. 1 but in an exploded form to show the various layers.
Figure 3:
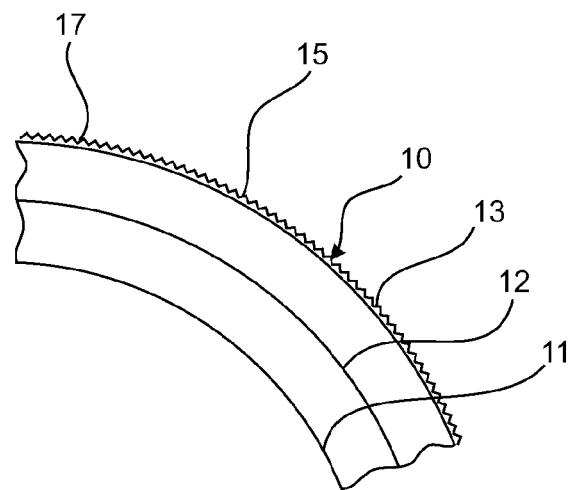
FIG. 3 is a fragmentary sectional view of a portion of the arrangement shown in FIG. 2, but on a larger scale.

Referring to FIGS. 1 to 3, there is shown a first embodiment of a tube 10 according to the invention, the tube being in the form of a composite film structure comprising a co-extrusion of a plurality of layers bonded together to provide an integrated structure. In the arrangement shown, there are three layers, comprising an inner layer 11, an intermediate layer 12 and outer layer 13.

When constructed, the tube 10 is flexible in the sense that it can be caused to assume a compact condition for storage or transport. The tube may, for example, be able to assume a "lay flat" condition in which the tube is collapsed upon itself. The tube may be wound into roll form to assume the compact condition, preferably while in the "lay flat" condition. Additionally, or alternatively, the tube may be folded at intervals along its length back and forth upon itself in sections to assume the compact condition, preferably while in the "lay flat" condition.

In other embodiments there may be more than one intermediate layer 12.

There may also be adhesive or other matter between the layers.

There may also be a further layer applied to the radially inner side of the inner layer 11 and/or a further layer applied to the radially outer side of the outer layer 13.

The intermediate layer 12 is of a material compatible with two adjacent layers 11, 13 between which it is interposed, wherein the intermediate layer 12 provides a bridge between the two layers 11, 13. In this way, the intermediate layer 12 cooperates with the inner and outer layers 11, 13 to provide the tube 10 as an integrated structure.

The inner layer 11 comprises a thermoplastic polyurethane (TPU) in this embodiment. Other suitable materials may also be used for the inner layer, such as for example ethylene-vinyl alcohol (EVOH) or polyethylene (PE, LLDPE or HDPE), as would be understood by a person skilled in the art.

The outer layer 13 comprises a plastic such as polyvinyl chloride/vinyl (PVC) or some acrylic co-polymer, vinyl or co-polymer vinyl. In particular, the outer layer may comprise a thermoplastic rubber; for example, thermoplastics elastomer (TPE).

The intermediate layer 12 comprises a copolymer compatible with the two adjacent layers 11, 13.

Where the inner layer 11 comprises TPU and the outer layer 13 comprises a vinyl or co-polymer vinyl, the two layers 11, 13 may not be sufficiently compatible to an extent to provide an integrated structure that can be extruded, and so an intervening medium constituted by the intermediate layer 12 may be required to provide a bridge between the two layers 11, 13. In this way, the intermediate layer 12 cooperates with the inner and outer layers 11, 13 to provide an integrated structure which constitutes the tube 10. In this embodiment, the intermediate layer comprises a blend of thermoplastic polyurethanes (TPUs), such as a blend of ester and ether. Other suitable materials may also be used for the intermediate layer, as would be understood by a person skilled in the art. The number and characteristics of each adhesive to bond adjacent layers together would be selected according to the intended application, as would be understood by a person skilled in the art.

The tube 10 is formed as a co-extrusion composite film structure in a multi-layer blown film extrusion process (also known as a tubular film extrusion process). In this process, the various layers 11, 12, 13 are extruded though an extrusion head as separate layers which subsequently merge together to provide the integrated tube 10. The blown film extrusion process may be performed in a blown film extrusion plant of known kind, in which the extrusion process is typically performed vertically upward (although other arrangements may be possible, including horizontal and vertically downward).

In the arrangement illustrated in FIG. 3, the exterior surface 15 of the tube 10 is optionally treated or modified.

The treatment may comprise surface modification. By way of example, the treatment may comprise corona treatment featuring low temperature corona discharge plasma to effect changes in the properties of the exterior surface of the tube 10. The corona treatment may be imparted to the outer layer 13 during the blown film extrusion process, prior to collapsing of the multi-layer composite film structure (which constitutes the tube 10) into a lay-flat condition for winding into roll form.

The exterior surface 15 of the tube 10 may be intended for bonding with another substance, such as a resinous binder. The bonding may be in the nature of a chemical bond. The bonding may be mechanical as well as chemical.

The exterior surface of the tube may be treated to facilitate a mechanical bond with a substance such as a resinous binder. The exterior surface may be so treated by provision of a formation on the exterior surface conducive to mechanically bonding with the resinous binder. By way of example, the formation may comprise texturing, knurling, scuffing, tearing, abrading, grinding or other roughening on the surface. The formation may present protrusions projecting from the tube 10, the protrusions being configured for anchoring in the binder. Further, the formation may comprise an anchoring structure applied to the surface; for example, spicules of fibre sprayed onto and embedded in the exterior surface using heat.

In the arrangement shown, the exterior surface 15 is so treated by provision of a formation 17 on the exterior surface conducive to mechanically bonding with resinous binder. By way of example, the formation 17 may comprise texturing, knurling, scuffing, tearing, abrading, grinding or other roughening on the surface 15. In a specific arrangement, the formation 17 may present protrusions projecting from the tube 10 to embed in the resinous binder and thereby serve to anchor the tube 10 upon curing of the resinous binder.

The formation 17 may be applied to the outer layer 13 during the co-extrusion process or it may be applied subsequently, such as after formation of the integrated tube structure.

In this embodiment, the tube 10 comprises a co-extruded multi-layer film structure having a wall thickness which is typically in the range of about 1 to 5 millimetres.

When constructed, the tube 10 is flexible in the sense that it can be caused to assume a compact condition for storage or transport. The tube may, for example, be able to assume a "lay flat" condition in which the tube is collapsed upon itself. The tube may be wound into roll form to assume the compact condition, preferably while in the "lay flat" condition. Additionally, or alternatively, the tube may be folded at intervals along its length back and forth upon itself in sections to assume the compact condition, preferably while in the "lay flat" condition.

In other embodiments there may be more than one intermediate layer 12.

Figure 4:
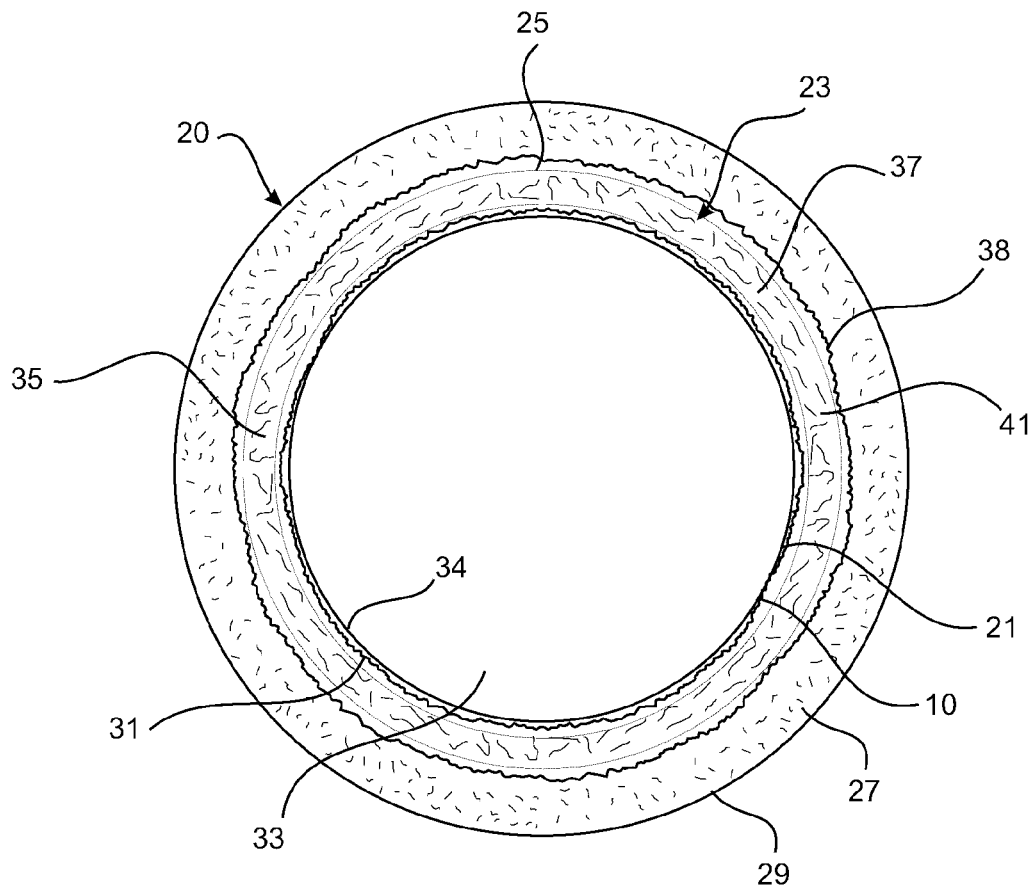
FIG. 4 is schematic cross-sectional view of a hollow structure according to a second embodiment of the invention, the hollow structure being configured as a pipe and being constructed using the tube shown in FIGS. 1 to 3.
Figure 5:
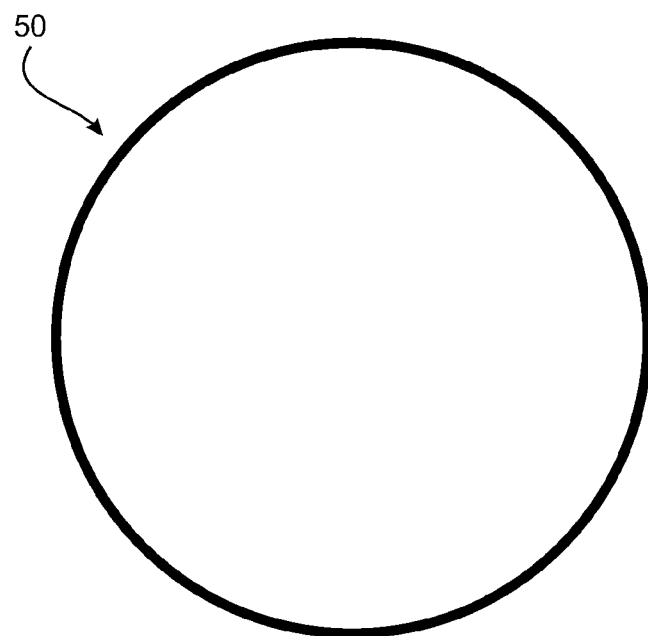
FIG. 5 is a schematic cross-sectional view of a tube assembly according to a third embodiment of the invention, the tube assembly comprising a tube and a coating applied to the tube.

Referring to FIG. 4, there is shown a hollow structure 20 according to a second embodiment of the invention. In the arrangement shown, the hollow structure 20 is in the form of a tubular element configured as a pipe and is constructed using the tube 10 shown in FIGS. 1 to 3.

Typically, the tube 10 would be delivered in its compact condition to a site at which the hollow structure 20 is to be constructed.

The pipe 20 is of composite construction, comprising a radially inner portion 21 and a radially outer portion 23, with the two portions 21, 23 merging together to provide an integrated tubular wall structure 25.

In the arrangement illustrated, the outer portion 23 is encased within a protective sheath 27 comprising a hardenable composition such as cement or concrete contained by an outermost skin 29 of any suitable material, such as geotextile cloth. The protective sheath 27 is intended to afford protection to the pipe 20 against compression loading to which it might be exposed once in the installed condition. However, it likely that the protective sheath 27 will not be employed in many instances.

The inner portion 21 comprises the tube 10 which will be described in more detail later. Typically, the tube 10 is no longer flexible once the integrated tubular wall structure 25 of the pipe 20 has been formed.

Prior to formation of the integrated tubular wall structure 25 of the pipe 20, as will be described later, the tube 10 defines an inflatable bladder 31 having an inflation cavity 33. With this arrangement, the tube 10 can be caused to undergo radial expansion upon inflation of bladder 31 by introduction of an inflation fluid such as, for example, air or water. The inflation pressure required to inflate the tube 10 is relatively low; typically in the order of 5 psi or 0.3 bar.

Upon formation of the integrated tubular wall structure 25, the tube 10 also defines the interior wall 34 of the pipe 20, as can be seen in FIG. 4. More particularly, the inner layer 12 of the tube 10 defines the interior wall 34 of the pipe 20.

The outer portion 23 is configured as an outer tube 35 of fibre reinforced composite construction surrounded by a flexible outer casing 38. More particularly, the outer tube 35 comprises reinforcement 37 impregnated in a resinous binder. The flexible outer casing 38 is installed around the outer tube 35 to contain the resinous binder prior to curing thereof. The flexible outer casing 38 may be formed of any appropriate material, including for example polyethylene. The outer casing 38 may remain in place and ultimately form an integral part of the pipe 20, or it may be subsequently removed after having served its purpose. In the arrangement shown, the outer casing 38 remains in place, surrounded by the protective sheath 27 encasing the outer portion 23.

The outer casing 38 may comprise an outer layer of polyethylene or TPU or PVC, and a fibrous layer bonded onto one face thereof, the arrangement being that the fibrous layer confronts the reinforcement 37. The fibrous layer may provide a breather layer and may also be ultimately impregnated with the resinous binder for integration of the assembly.

The resinous material which provides the resinous binder may be of any appropriate type as would be understood by a person skilled in the art; a particularly suitable resinous material may comprise thermosetting resin such as epoxy vinyl ester or other suitable resin and thermoplastic resin systems.

The reinforcement 37 may comprise one or more layers of reinforcing fabric, each layer being configured as an annular layer disposed about the tube 10. Where there are multiple annular layers, the layers are typically disposed one about another, in what could be described generally as somewhat of a concentric arrangement. The reinforcing fabric preferably comprises reinforcing fabric which incorporates reinforcement fibres featuring quadraxial fibre orientations. The quadraxial fibre orientations offer the necessary hoop and axial stress bearing properties to the pipe. The reinforcement fibres may comprise glass fibres.

The flexible outer casing 38 serves to resist radial expansion of the reinforcing fabric annular layers (which constitute the reinforcement 37) upon radial expansion of the tube 10, thereby causing the reinforcement 37 to be subjected to radial compression. With this arrangement, the reinforcement 37 is confined in the space 41 between the expanding tube 10 and the flexible outer casing 38. Specifically, the radially expanding tube 10 operates in conjunction with the flexible outer casing 38 to confine the reinforcement 37 and also causes the volume of the space 41 in which the reinforcement is confined to progressively decrease. This forces the resinous binder within the reinforcement 37 to fully impregnate the reinforcement; that is, the layers of reinforcing fabric configured as the annular layers which constitute the reinforcement become fully "wetted-out". In particular, it provides a compaction force to the reinforcement 37 and effectively pumps the resinous binder through the layers of reinforcing fabric to distribute the resinous binder within the space 41 in a controlled and constrained manner. It is a particular feature of this process that the step of delivering resinous binder to the reinforcement 37 and the step of fully wetting out the reinforcement with the resinous binder are separate and distinct actions. One manner in which resin could be delivered to the reinforcement 37 is disclosed in aforementioned PCT/AU2011/001401, the contents of which are incorporated herein by way of reference The progressive decrease in volume of the space 41 in which the reinforcement 37 is confined acts to positively expel air from within the space 41 which has the effect of enhancing impregnation of the resinous binder within the reinforcement. The outer casing 38 and the various reinforcing fabric annular layers which constitute the reinforcement 37 may be adapted to facilitate the expulsion of the air. By way of example, the breather layer defined by the fibrous inner layer of the outer casing 38 may facilitate this expulsion of air. Further, interstices within the reinforcing fabric annular layers which constitute the reinforcement may provide pathways for air expulsion. Still further, the outer casing 38 and the various reinforcing fabric annular layers may, for example, incorporate vents at intervals along their respective lengths to facilitate expulsion of the air. In one arrangement, the vents may comprise perforations, such as puncture holes, formed in the outer casing 38 and the various reinforcing fabric annular layers. With such an arrangement, the perforations are ultimately sealed by the resinous binder to ensure the sealed integrity of the pipe 20. In another arrangement, the vents may comprise ports inserted in the outer casing 38 and the various reinforcing fabric annular layers which constitute the reinforcement 37. The ports may, for example, comprise tubular inserts formed of a material which dissolves or otherwise degrades upon exposure to the resinous binder. With such an arrangement, the apertures in which the ports were accommodated are ultimately sealed by the resinous binder to ensure the sealed integrity of the pipe 20.

The flexible outer casing 38 may have some resilience in order to yielding resist radial expansion of the reinforcing fabric annular layers which constitute the reinforcement 37, at least to some extent. In this way, the flexible outer casing 38 can cushion the initial stage of the radial expansion of the reinforcing fabric annular layers. In particular, it is desirable that the flexible outer casing 38 have some elasticity. The flexible outer casing 38 may have some elasticity for the purpose of enhancing control of the rate at which the progressively rising pool of resinous binder progressively wets the reinforcement 37. If, on the one hand, the resinous binder rises within the space 41 too rapidly, it may be that full wet-out of fibres in the reinforcement 37 is not achieved. If, on the other hand, the resinous binder rises within the space 41 too slowly, it may be that the resinous binder could commence to cure before full wet-out of fibres in the reinforcement 37 is achieved.

The elastic nature of the flexible outer casing 38 installed around the assembled around the reinforcement 37 functions somewhat as a girdle for controlling external pressure exerted on the rising pool of resinous binder. The elastic characteristic of the flexible outer casing 38 is selected to achieve the desired rate of wet-out. The elastic force exerted by the outer casing 38 provides some counterbalancing of the tension exerted by the inflating bladder 31 defined by the tube 10.

The inflatable bladder 31 is typically maintained in the inflated condition until such time as the resinous binder has hardened sufficiently to maintain the form and shape of the pipe 20, after which the inflation fluid can be released from the inflation cavity 33. The pipe 20 thus is formed, with the tube 10 defining the central flow passage within the pipe.

Further details regarding the construction of the pipe 20, and also the method by which it can be constructed, are set out in aforementioned PCT/AU2011/001401, the contents of which are incorporated herein by way of reference.

In the arrangement shown, as best seen in FIG. 2, the tube 10 comprises a co-extrusion of three layers bonded together to provide an integrated composite film structure. In the arrangement shown, there are three layers, comprising the inner layer 11, the intermediate layer 12 and the outer layer 13.

The composite film structure which provides the tube 10 is formed as a co-extrusion of the three layers using a co-extrusion system of known kind.

The inner layer 11 comprises a material compatible with the intended application of the pipe 20. By way of example, where the intended application of the pipe 20 is for transport of a fluid (gas, liquid or other flowable material such as a slurry), the inner layer 11 would be of a material compatible with the fluid to be transported. This may require that the inner layer 11 provide a tube wall which is impervious to the fluid, which is of relatively low resistance to fluid flow, which is resistant to corrosion, and which is resistant to abrasion and wear.

The inner layer 11 may comprise thermoplastic polyurethane (TPU), ethylene-vinyl alcohol (EVOH), or polyethylene (such as PE, LLDPE or HDPE). However, other suitable materials may also be used for the inner layer, as would be understood by a person skilled in the art.

The outer layer 13 comprises a material compatible with binder in the form of a thermosetting resin. In this embodiment, the outer layer 13 comprises a vinyl or co-polymer vinyl, such as for example polyvinyl chloride/vinyl (PVC) or some of the acrylic copolymers. Specifically, the outer layer 13 may comprise polyvinyl chloride/vinyl (PVC).

The outer layer 13 may alternatively comprise a thermoplastic rubber (such as thermoplastics elastomer (TPE) which is particularly suitable where the resinous binder comprises a vinyl ester resin as is the case in this embodiment. However, other suitable materials may also be used for the outer layer, as would be understood by a person skilled in the art.

The intermediate layer 12 may comprise a copolymer compatible with the two adjacent layers.

In this embodiment in which the inner layer 11 comprises TPU and the outer layer 13 comprises a vinyl or co-polymer vinyl, such as PVC, the two layers 11, 13 would not be compatible to an extent to provide an integrated structure, and so the intermediate layer 12 is required to provide a bridge between the two layers 11, 13. In this way, the intermediate layer 12 cooperates with the inner and outer layers 11, 13 to provide the tube 10 as an integrated structure.

However, other suitable materials may also be used for the intermediate layer 12, as would be understood by a person skilled in the art.

The exterior surface 15 of the tube 10 is configured to bond mechanically, as well as chemically, with the resinous binder used in the formation of the outer portion 23 of the pipe to further enhance integration between the inner portion 21 (defined by the tube 10) and the outer portion 23.

For this purpose, the exterior surface 15 of the tube 10 is treated to facilitate the mechanical bond with the resinous binder. In the arrangement shown, the formation 17 on the exterior surface 15 is so configured to be conducive to mechanically bonding with the binder. In a specific arrangement, the formation 17 may present protrusions projecting from the tube 10 to embed in the resinous binder and thereby serve to anchor the tube 10 to the outer portion 23 upon curing of the resinous binder.

The characteristics required of the inner layer 11 may call for a material which may not be compatible with the resinous binder in order to achieve good adhesion with the binder. It is for this reason that the tube 10 comprises a plurality of layers, with the inner layer 11 being of a material providing the required characteristics as discussed above and the outer layer 13 being of a material providing good adhesion with the binder. The intermediate layer(s) 12 is disposed between the inner and outer layers 11, 13 to provide a bridge therebetween.

Referring to FIGS. 5 to 16, there is shown a tube assembly 50 according to a third embodiment the invention. The tube assembly 50 comprises a tube 51 having an exterior surface 53, and a coating 55 applied to the exterior surface.

The tube 51 is in the form of a composite film structure comprising a co-extrusion of a plurality of layers bonded together to provide an integrated structure. While not apparent in the drawings, the layers include an inner layer and an outer layer. There may be one of more intermediate layers between the inner and outer layers. Each intermediate layer may be of a material compatible with two adjacent layers between which it is interposed. In other words, the tube 51 may be of essentially the same construction as tube 10 of the first embodiment. However, this need not necessarily be so, as the tube 51 may be of any other appropriate co-extruded multi-layer construction.

In the arrangement shown, the coating 55 comprises a continuous coating along the exterior surface 53 of the tube 51. In another arrangement, the coating 55 may be provided intermittently (i.e. at intervals along the tube 51). Where the coating 55 is provided intermittently, it may for example comprise patches or tufts of coating material on the exterior surface of the tube.

The coating 55 may be applied in any appropriate way, such as by heat welding.

The coating 55 may be of any appropriate material; for example, the coating may comprise binder absorbent material. In this embodiment, the coating 55 comprise a wetting material. The wetting material may be bonded such as by heat welding to the tube 51 to provide a chemical and mechanical bond between the tube and binder (such as resin binder). The wetting material may comprise polyester felt. In this way, the coating 55 may serve to facilitate a resin-rich layer in direct contact with the tube 51.

Figure 6:
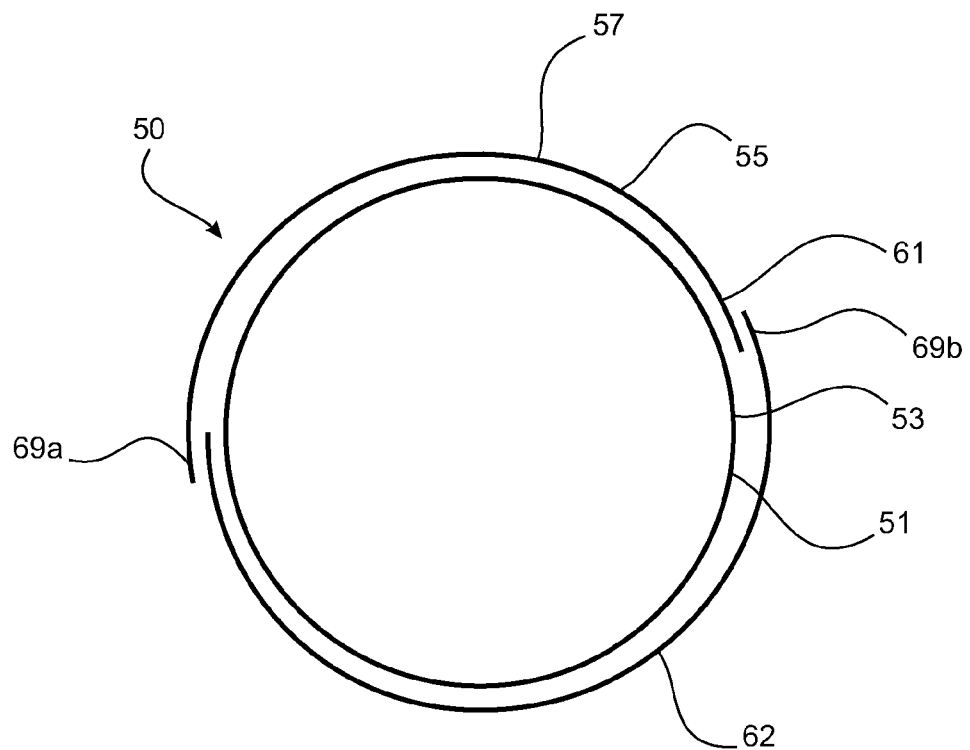
FIG. 6 is a view similar to FIG. 5 but in an exploded form to show the various parts.

In this embodiment, the coating 55 is applied by applying longitudinal strips 57 of coating material to the exterior surface 53 of the tube 51. In the arrangement shown, the longitudinal strips 57 comprise two strips 61, 62 applied about the tube 51 in side-by-side relation. In the arrangement shown, the longitudinal marginal edge portions of the two strips 61, 62 are in overlapping relation one with respect to the other, as best seen in FIG. 6. Other arrangements are contemplated; for example, adjacent longitudinal marginal edge portions of the two strips 61, 62 may be in abutting relation, or in spaced apart relation to define a gap therebetween.

Figure 7:
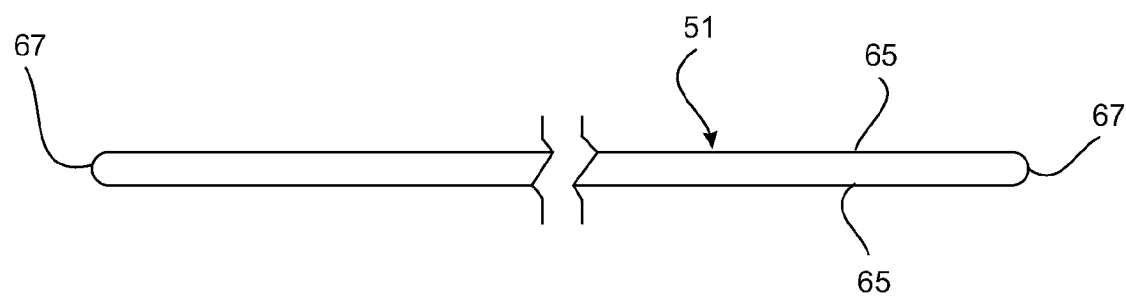
FIG. 7 schematic cross-sectional view of the tube in a flattened condition.
Figure 8:
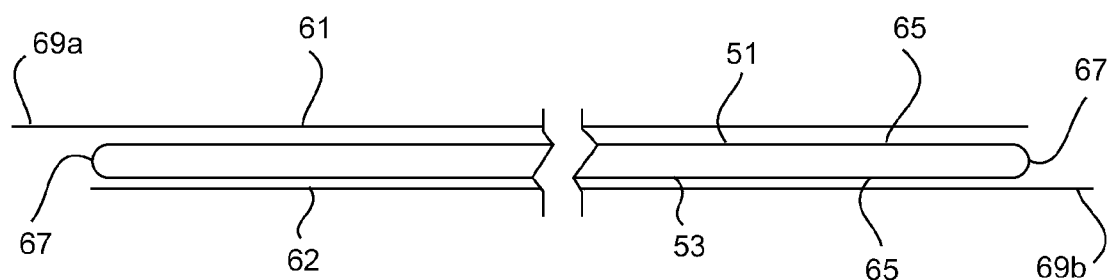
FIG. 8 is a view similar to FIG. 7 but with two strips of coating material positioned on opposed sides of the flattened tube.
Figure 9:
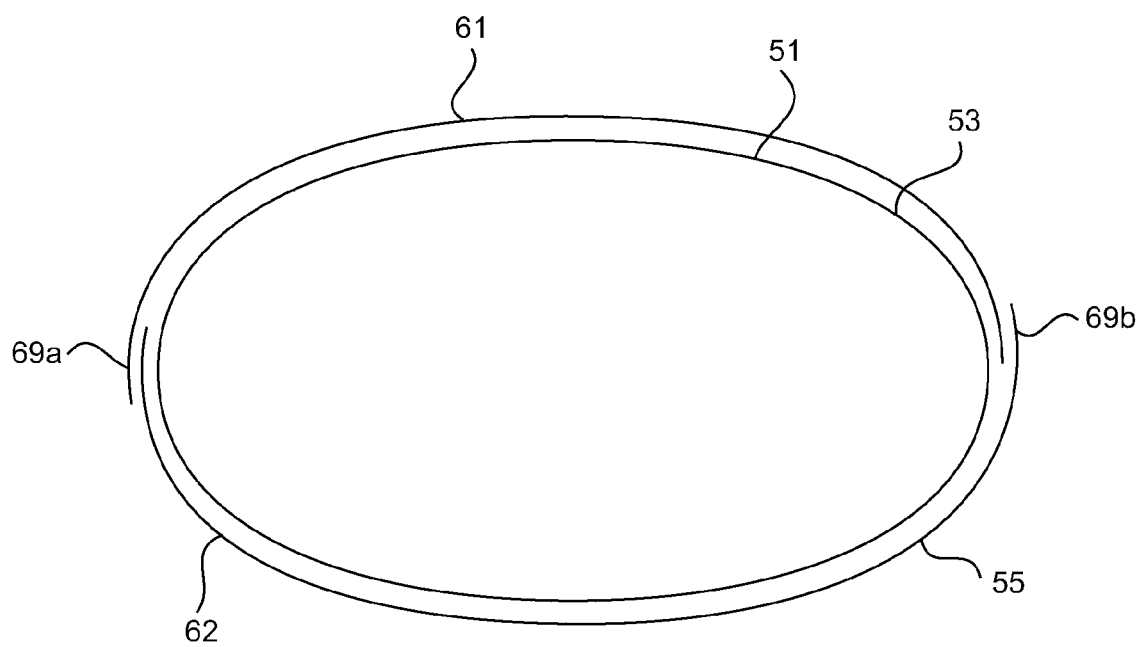
FIG. 9 is a view of the arrangement shown in FIG. 8, but with the tube undergoing inflation.

One way in which the coating 55 may be applied to the tube 51 is depicted schematically in FIGS. 7, 8 and 9.

After having been formed, the tube 51 is collapsed to assumed a lay-flat condition, or at least a somewhat flattened (squashed) condition, to present to opposed broad longitudinal faces 65 and two opposed rounded longitudinal edges 67, as shown in FIG. 7.

The two strips 61, 62 are then applied to the tube 51, one to each broad longitudinal face 65, as shown in FIG. 8. The width of each strip 61, 62 is dimensioned in relation to the respective broad face 65 to which is applied such that the strip can be aligned at one side with one rounded longitudinal edge 67 and extend beyond the other rounded longitudinal edge 67 on the other side, as shown in FIG. 8. The marginal edge portion of each strip 61, 62 extending beyond the respective rounded longitudinal edge 67 provides a protruding flap portion 69. The two strips 61, 62 are so positioned with respect to the tube 51 that the flap portions 69 are disposed at opposed ends of the flattened tube 51, as shown in FIG. 8. With this arrangement, strip 61 presents flap portion 69a, and strip 62 presents flap portion 69b.

The tube 51 is then inflated, as shown in FIG. 9, causing the protruding flap portions 69 to progressively move towards and ultimately into contact with the exterior surface 53 of the tube 51. A guide system such a guide rollers may be provided to influence movement of the flap portions 69 towards the exterior surface 53 of the tube 51. The flap portions 69 move into contact with the exterior surface 53 of the tube 51, with the flap portion of each strip overlapping the adjacent marginal edge portion of the other strip, as best seen in FIG. 6. With this arrangement, adjacent longitudinal marginal edge portions of the strips 61, 62 are in overlapping relation. The flap portions 59 are bonded into position in any suitable way, such as by heat welding. While the flap portion 69 of each strip 61, 62 overlaps the adjacent marginal edge portion of the other strip in the arrangement shown, other arrangements are contemplated. In another arrangement, the flap portion 69 of each strip 61, 62 may abut (rather than overlap) the adjacent marginal edge portion of the other strip. In yet another arrangement, adjacent longitudinal marginal edge portions of the strips may be interconnected in some other way; for example, by way of a tape applied between the marginal edge portions. In still yet another arrangement, adjacent longitudinal marginal edge portions of the strips may be in spaced apart relation to define a gap therebetween.

During the application process, the coating 55 is bonded to the entirety of the exterior surface 53 of the tube 51, not only at the location of the flap portions 59. The strip 61, 62 may be pressed into the exterior surface 53 of the tube 51 during the application process (for example by press rollers), thereby embedding the strips in the exterior surface and integrating the coating 55 with the tube 51. The application process may involve heat being imparted to the strips 61, 62 and/or the tube 51 to facilitate bonding therebetween.

The coating 55 can be applied immediately after formation of the tube 51, or at a later stage of the production process.

The tube assembly 50 can be produced on a continuous basis, with the tube 51 being extruded continuously, and the coating 55 applied continuously to the extruded tube as it advances along a production path. The strips 61, 62 can be delivered to the production path continuously, being unwound from respective reels in which strip material is stored in ribbon form.

Figure 10:
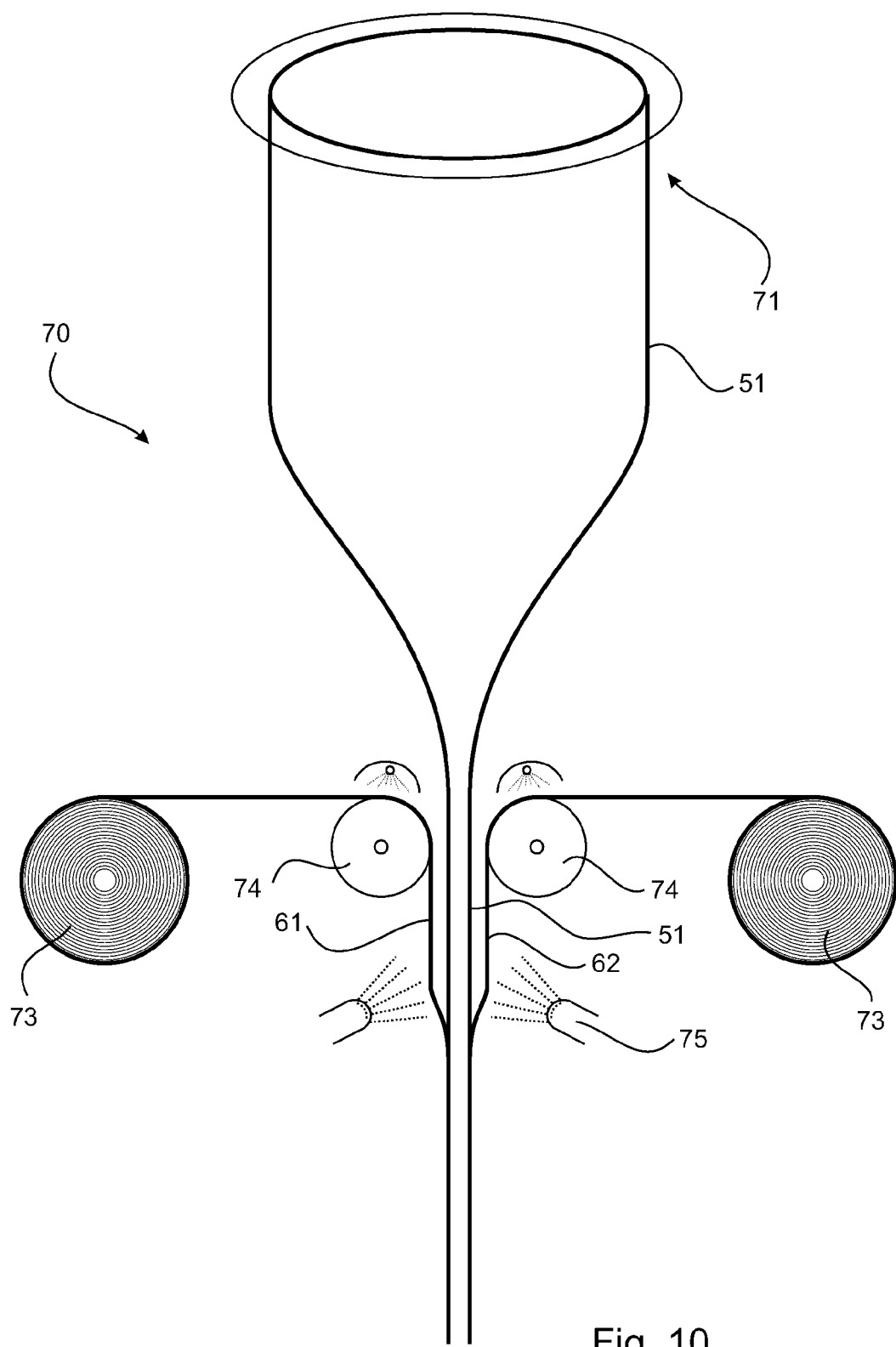
FIG. 10 is a schematic view of part a production line for the tube assembly according to a third embodiment of the invention.
Figure 11:
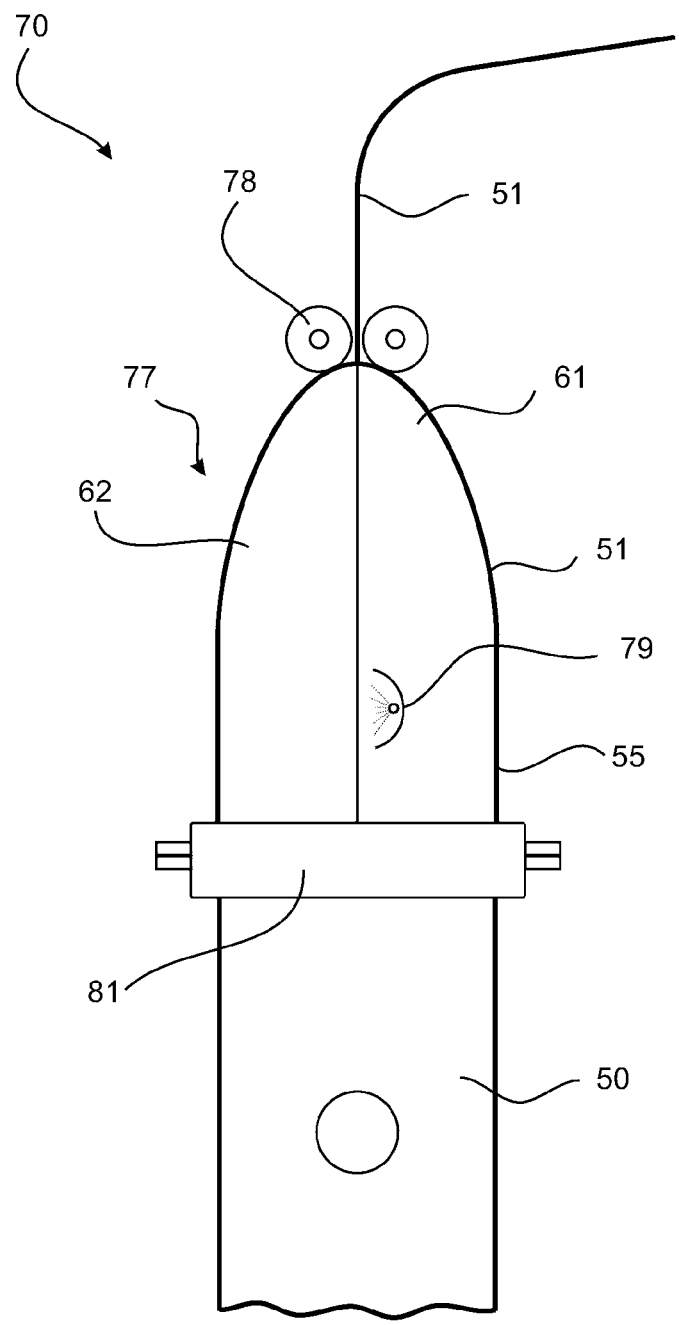
FIG. 11 is a schematic view of another part a production line.
Figure 12:
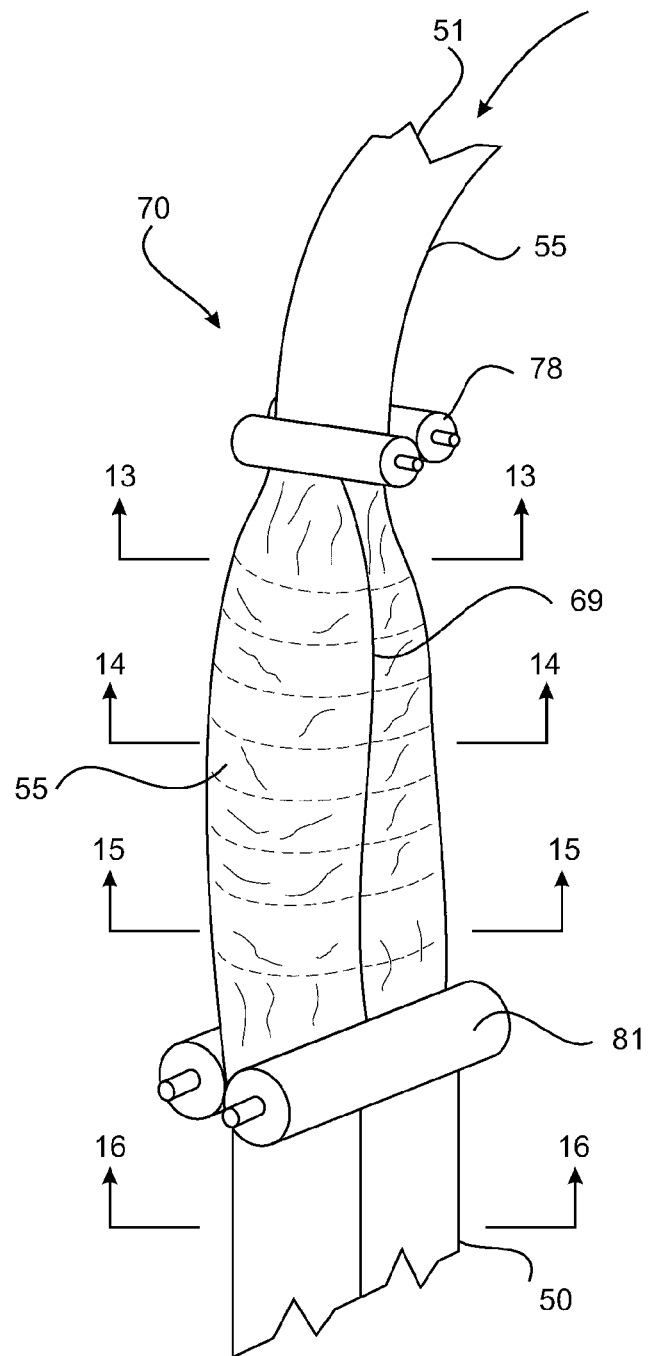
FIG. 12 is a schematic perspective view of the arrangement shown in FIG. 11.
Figure 13:
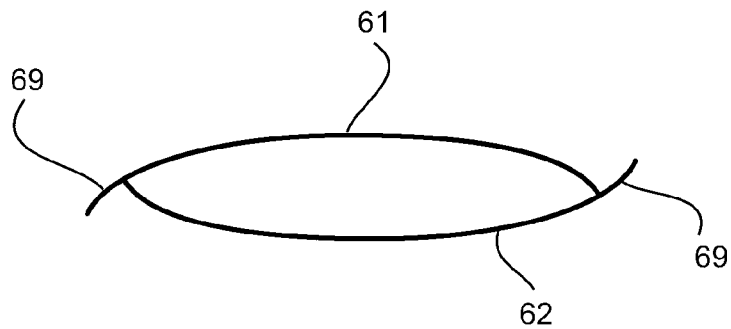
FIG. 13 is a cross-section on line 13-13 of FIG. 12.
Figure 14:
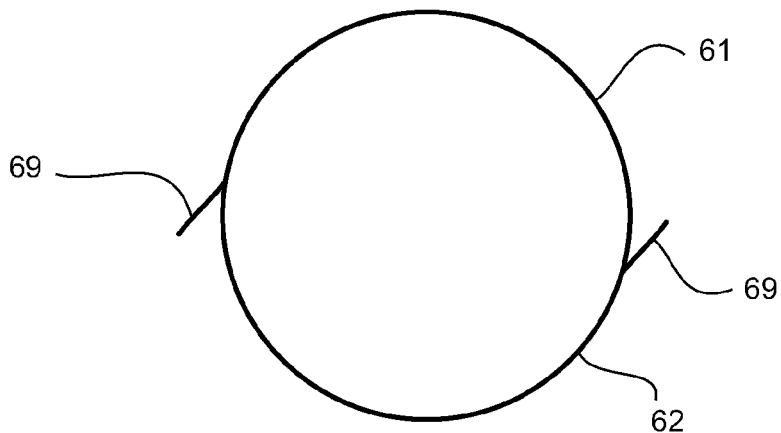
FIG. 14 is a cross-section on line 14-14 of FIG. 12.
Figure 15:
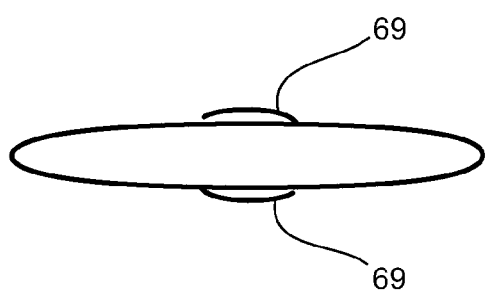
FIG. 15 is a cross-section on line 15-15 of FIG. 12.
Figure 16:
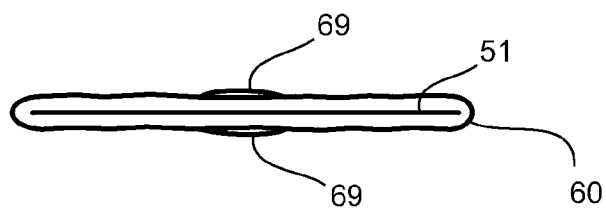
FIG. 16 is a cross-section of the tube assembly on line 16-16 of FIG. 12.

The tube assembly 50 may be produced on a continuous basis along a production line 70, a typical example of which is depicted schematically in FIGS. 10, 11 and 12.

FIG. 10 depicts extrusion station 71 at which the tube 51 is formed, and also station 72 at which the tube 51 is collapsed to assume a lay-flat condition to progressively receive the strip 61, 62 as it advances along the production line 70. The strips 61, 62 are delivered to the production line 70 continuously, being unwound from respective reels 73 in which strip material is stored in ribbon form. Rollers 74 serve to guide the advancing strips 61, 62 towards the tube 51 and press the strips 61, 62 into contact with the exterior surface of the tube 51. The rollers 74 also assist in collapsing the tube 51 to assume the lay-flat condition. A cooling system 75 may be provided to cool the assembly and stabilise the bond between the strips 61, 62 and the tube 51. At this stage, the flap portions 69 are protruding, as previously described.

FIGS. 11 and 12 depict station 77 at which the collapsed tube 51 is inflated after moving through roller arrangement 78, causing the protruding flap portions 69 to progressively move towards and ultimately into contact with the exterior surface 53 of the tube 51. A heater 79 is provided to facilitate bonding of the flap portions 69 in position. Roller arrangement 81 is provided to press the flap portions 69 firmly into place and to also collapse the tube 51, thereby causing the tube assembly 50 to assume a lay-flat condition. Once in the lay-flat condition, the tube assembly 50 can be stored; for example, in a rolled or folded condition.

The cross-sectional shape of the tube assembly 50 is shown at various stages of the production process in FIGS. 13 to 16.

The tube assembly 50 may be substituted for tube 10 in the hollow structure 20 according to a second embodiment of the invention described previously.

From the foregoing it is evident that the above embodiments each provide a simple yet highly effective arrangement for mass production of an extruded tube according to the invention.

The foregoing disclosure is intended to explain how to fashion and use each of the particular embodiment described, rather than to limit the true, intended, and fair scope and spirit of the invention. The foregoing description is neither intended to be exhaustive, nor to be limited to the precise forms disclosed.

Further, it should be appreciated that various modifications can be made without departing from the principles of the invention. Therefore, the invention should be understood to include all such modifications within its scope.

The terminology used herein is for the purpose of describing a particular example embodiment only and is not intended to be limiting.

As used herein, the singular forms "a", "an" and "the" may be intended to include the plural forms as well, unless the context clearly indicates otherwise.

The method steps, processes, and operations described herein are not to be construed as necessarily requiring their performance in the particular order discussed or illustrated, unless specifically identified as an order of performance. It is also to be understood that additional or alternative steps may be employed.

Reference to any positional descriptions, such as "top", "bottom" and "side", are to be taken in context of the embodiment described and illustrated, and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the example term "below" can encompass both an orientation of above and below. The apparatus may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiment When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A tube comprising:
 a. a co-extrusion composite film structure consisting of a plurality of polymer layers;
 b. wherein the plurality of polymer layers include a co-extruded inner layer defining an interior surface of the tube, an outer layer defining an exterior surface of the tube and at least one intermediate layer between the inner and outer layers, the intermediate layer being of a material compatible with the inner and outer layers between which it is interposed;
 c. wherein the co-extrusion composite film structure is jointless along its length;
 d. wherein the exterior surface of the tube is bonded with a resinous binder; and
 e. wherein the resinous binder forms part of a second tube of fibre reinforced construction comprising at least one annular layer of reinforcement fabric comprising reinforcement fibres, said annular layer of reinforcement fabric being impregnated with the resinous binder.

2. The tube according to claim 1 wherein the exterior surface of the tube has a coating applied thereto to facilitate bonding with the binder.

3. The tube according to claim 1 wherein the outer layer comprises a thermoplastic rubber.

4. The tube according to claim 1 wherein the outer layer comprises thermoplastics elastomer (TPE).

5. A tube according to claim 1, being an inflatable bladder having an inflation cavity for pumping said resinous binder during inflation of said inflatable bladder.

6. The tube according to claim 1 wherein the inner layer comprises a material compatible with the intended application of the tube.

7. The tube according to claim 6 wherein the inner layer is selected from a group consisting of a thermoplastic polyurethane, ethylene-vinyl alcohol and polyethylene.

8. The tube according to claim 1 wherein the outer layer comprises a material compatible with the binder.

9. The tube according to claim 8 wherein the outer layer is selected from a group consisting of polyvinyl chloride/vinyl, acrylic co-polymer, vinyl and co-polymer vinyl.

10. A hollow structure of composite construction, the hollow structure comprising a radially inner portion and a radially outer portion, with the two portions merging together to provide an integrated tubular wall structure, the inner portion being configured as a tube claim 1.

11. The hollow structure of according to claim 10 wherein the exterior surface of the tube is treated or modified to facilitate bonding with the binder.

12. The hollow structure according to claim 10 wherein the exterior surface of the tube has a coating applied thereto to facilitate bonding with the binder.

13. The hollow structure according to claim 10 further comprising a resin-rich layer in direct contact with the exterior surface of the tube.

14. The hollow structure according to claim 13 wherein the resin-rich layer comprises a wetting material and resin.

15. The hollow structure of composite construction according to claim 14 wherein the resin-rich layer comprises polyester felt wetted with resin.

16. A tube comprising:
 a. a co-extrusion composite film structure having a plurality of polymeric layers;
 b. wherein the plurality of layers include a co-extruded inner layer defining an interior surface of the tube, an outer layer defining an exterior surface of the tube and at least one intermediate layer between the inner and outer layers, the intermediate layer being of a material compatible with the inner and outer layers between which it is interposed;
 c. wherein the co-extrusion composite film structure is jointless along its length;
 d. wherein the exterior surface of the tube is bonded with a resinous binder;
 wherein the resinous binder forms part of a second tube of fibre reinforced construction comprising at least one annular layer of reinforcement fabric comprising quadraxially oriented reinforcement fibres, said annular layer of reinforcement fabric being impregnated with the resinous binder; and
 wherein the exterior surface of the tube is treated by provision of a formation on the exterior surface to facilitate bonding with the resinous binder.

17. A tube according to claim 16, wherein the exterior surface of the tube has a coating comprising a wetting material absorbent of the resinous binder.

* * * * *